Dec. 31, 1929.  C. SEYBOLD  1,741,439
SAFETY STOPPING DEVICE
Filed Dec. 30, 1926  2 Sheets-Sheet 1
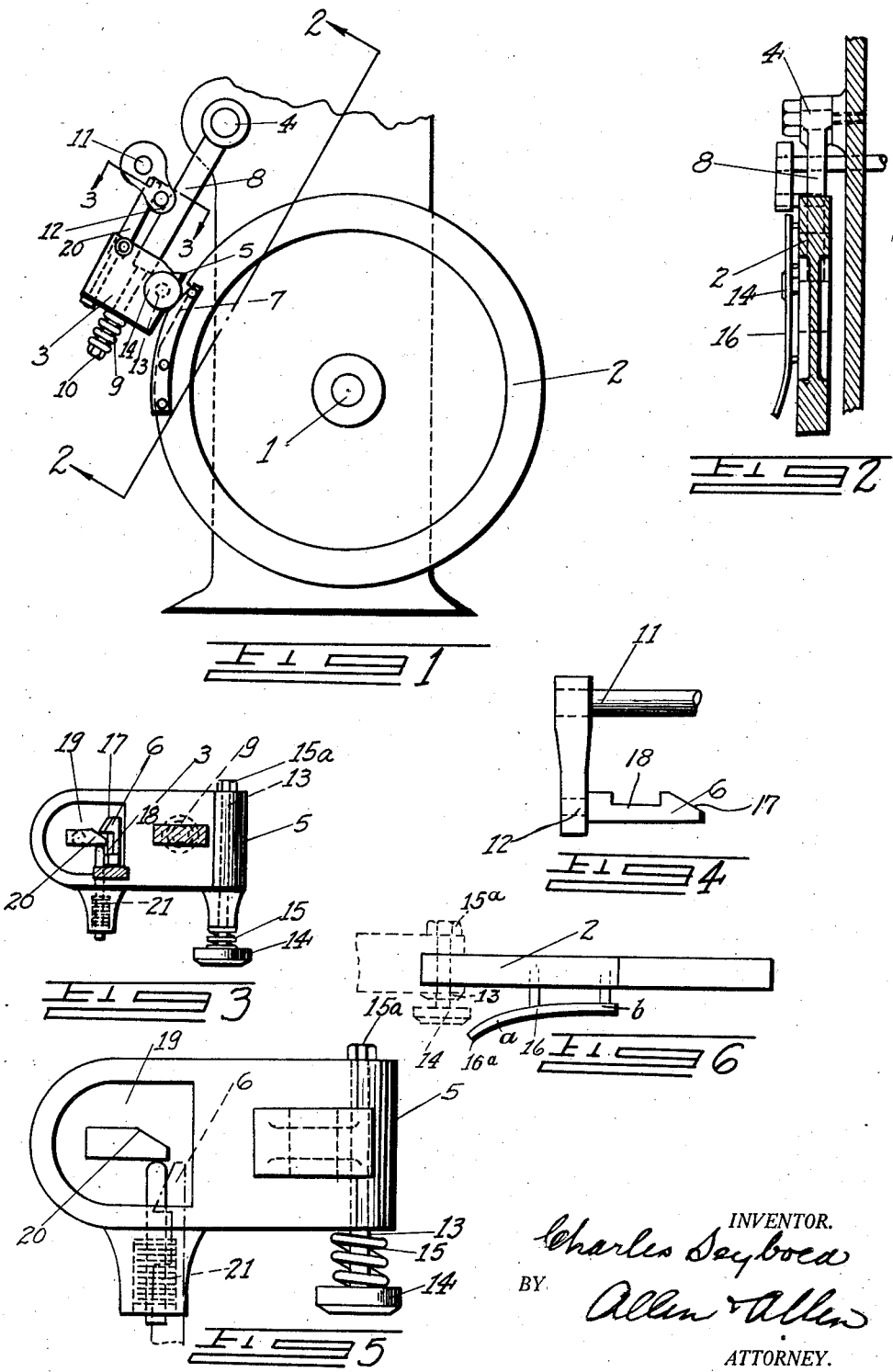
INVENTOR.
Charles Seybold
BY
Allen & Allen
ATTORNEY.

Dec. 31, 1929.   C. SEYBOLD   1,741,439
SAFETY STOPPING DEVICE
Filed Dec. 30, 1926   2 Sheets-Sheet 2
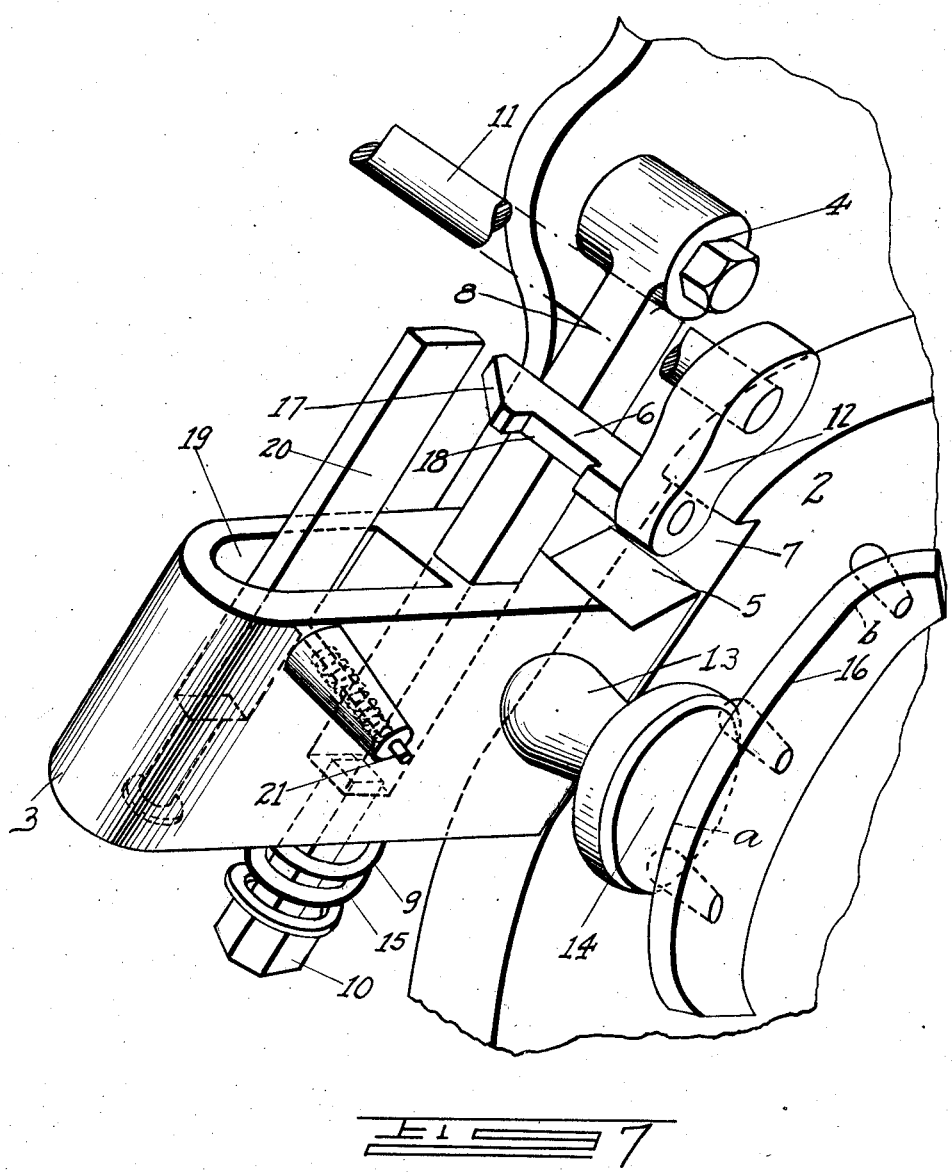
INVENTOR.
Charles Seybold
BY
ATTORNEY.

Patented Dec. 31, 1929

1,741,439

UNITED STATES PATENT OFFICE

CHARLES SEYBOLD, OF DAYTON, OHIO, ASSIGNOR TO THE SEYBOLD MACHINE COMPANY, OF DAYTON, OHIO, A CORPORATION OF OHIO

SAFETY STOPPING DEVICE

Application filed December 30, 1926. Serial No. 158,107.

My invention relates to the general class of safety stopping devices, and particularly to a novel type of device which will inhibit the operation of a mechanism subsequent to the passage of the mechanism through a definite cycle of movement.

It is the object of my invention to provide in combination with a machine, such as a paper cutter, for means independent of the clutch or tight and loose pulley control, which will positively inhibit the mechanism after a definite cycle of operation has been passed through. It is my object to provide a safety stopping device which will inhibit operation of a machine with each cycle of operation of the mechanism, and to incorporate with the safety stop mechanism, a device for inhibiting the operation of the safety stop which will be operatively connected with the normal operative control for the machine, but which will be moved to safety stop inhibiting position only during the cycle of movement of the control for the machine to on position, and which will, even though the control becomes inoperative, carry out its inhibiting function. It is a further object to provide a safety stop mechanism which will function even though many of the parts thereof become broken or worn out.

The above and other objects which will be related during the course of the ensuing disclosure, I accomplish by that certain construction and arrangement of parts of which the following is a specific illustration.

Referring to the drawings:—

Figure 1 is a side elevation of the driven wheel of a machine, showing the preferred arrangement of parts comprising the safety stopping mechanism.

Figure 2 is a transverse section along the lines 2—2 in Figure 1.

Figure 3 is another transverse section along the lines 3—3 in Figure 1, the parts being shown in operatively connected position.

Figure 4 is a detail side elevation of a suitable structure for connecting the machine control and the safety stop mechanism.

Figure 5 is an enlarged view of the parts shown in Figure 3, in disconnected position.

Figure 6 is a diagram showing the principle of operation of the safety stop inhibiting means.

Figure 7 is a perspective view of the assembly showing the preferred arrangement of parts.

I have shown the shaft 1 on which is fixedly mounted a pulley or wheel 2. A weight 3 pivoted at 4 has a toothed edge 5 which with each revolution of the wheel 2 registers with a notched portion 7 of the wheel. Normally the wheel which travels in a counter clockwise direction has the weight 3 bearing against its outer periphery. With each rotation therefore of the wheel, unless otherwise inhibited, the toothed edge 5 will inhibit further operation of the wheel. I contemplate stopping the wheel with each revolution of the machine, so that unless the operator voluntarily throws on the clutch after each cycle of operation, the further operation of the machine will be inhibited. In order to have the stop yield slightly so as not to injure the mechanism, I mount the arm 8 which carries the weight 3 as indicated in Figure 1. The arm 8 extends through an orifice in the weight, and a spring 9 bearing against a nut 10 on the end of the arm 8 provides a resilient bumper to prevent the shock on the mechanism of a too abrupt stop.

The machine is driven with a friction clutch which is not shown, as it forms no part of my invention. However, I have shown a shifting rod 11 with which the clutch is engaged and disengaged. An arm 12 is mounted on the clutch shifting rod, and in order explain the operation of the safety inhibiting mechanism, it may be noted that as shown in Figure 7, the parts are as they would appear prior to starting up the machine. To start the machine, the shifting rod in Figure 7 would be moved from right to left.

Extending out from the weight 3 there is a slidably mounted shaft 13 with a roller 14 with beveled edges. The shaft 13 is pushed outwardly by a spring 15 which bears against the side of the weight and against the inner face of the roller 14. A nut 15ª limits the outward movement of the shaft 13, but does not prevent the pulley from being pressed upwardly as shown in Figures 3 and 5.

The wheel 2 has fixedly mounted on its outer face a cam track 16 and the roller 14 is so positioned with relation to the cam track, that with each revolution of the wheel 2, the beveled side face of the pulley 14 engages the inner surface of the cam track. One end 16ª of the cam track is curved away from the surface of the wheel in order to allow easy passage of the roller 14 between the cam track and wheel. This curved end gradually straightens out until a portion of the cam track is parallel with the surface of the wheel. As soon as the weight is lifted, however, the pulley springs out so that its outer periphery will ride on the top surface of the cam track. With the lifting of the weight therefore, the roller rides on the cam track for a short distance, and then runs off the end of the track. The weight is during this brief interval lifted away from the peripheral surface of the wheel 2. After a revolution, however, the roller 14 will again ride in back of the cam track, so that the operation which raises the weight must again be repeated before the machine will perform another cycle.

The clutch shifting rod 11, as noted, carries an arm 12 to which is secured a dog 6 having an inclined face 17 and a notched portion 18. The weight 3 has a recessed portion 19 from which a latch 20 rotatably mounted in the base of its weight extends. The latch is so arranged that it will be free to pivot in a clockwise direction from the position shown in Figure 7, but is limited in a counter-clockwise pivotal movement by the side walls of the weight. A spring push pin 21 bears against a side of the latch 20 tending to press it to position bearing against the side wall of the weight.

The operation of the device is as follows: The device is shown almost at the end of a cycle of operation in Figure 7. In starting up the machine, the operator moves the shifter rod 11 from right to left. The inclined face 17 of the dog 6 bears against the side of the latch 20, and elevates the weight on the pivot 4 from the peripheral surface of wheel 2. The roller 14 then springs out and rides on the top surface of the cam track, and as the toothed edge 5 will be clear of the notch 7 the machine starts on a cycle of operation. As soon as the shifting rod is fully advanced, however, the front edge of the latch 20 drops into the notch 18 which permits enough downward movement for the weight to again bear against the outer periphery of the wheel 2. Thus, even if the shifting rod is left in on position, the machine will move only through one cycle of operation before the toothed edge of the weight engages the notch in the wheel 2. When the shifting rod is moved to off position, the spring pin 21 permits sufficient clockwise movement of the latch 20 so that the edges of the latch 20 will rock and clear the outer edge of the notched portion 18 of the dog 6 without elevating the weight on the pivot 4. The cycle of operation may then be repeated. If the shifting rod is left on, or if the clutch locks no harm will be done. The safety stopping mechanism will stop the wheel 2 after one revolution entirely independently of the clutch control.

The shaft 11 is connected with the clutch operating mechanism which is not illustrated as it forms no part of my invention. When the clutch is thrown in, the shaft 11 moves from right to left as illustrated in Figure 7. It is only when the high point of the inclined face 17 of the dog 6 is reached that the weight will be sufficiently elevated on the pivot 4 to allow the roller 14 to spring up onto the cam track. This occurs at the position indicated at "a" in Figure 7. As soon as the roller 14 is riding on the cam track the tooth 5 will be held clear of the notch 7. However, it is only during the brief interval that the roller rides from the position "a" to the position indicated at "b" that the tooth 5 will be clear of the notch 7. After completing a revolution the roller is guided along the inner edge of the cam track as indicated in Figure 6. It will thus be apparent that the roller can only ride on the surface of the cam track after a clutch engaging operation, a machine blocking operation, a clutch disengaging operation, and a repetition of the clutch engaging operation after the machine has been stopped.

I have developed this safety stopping device for a paper cutting machine. In such a machine, often an extra rotation caused by gripping of the clutch or other means, will cause the cutting knife to descend and cut off the hand or arm of an operator. I believe that the structure illustrated will have other uses with other types of machines, so I do not wish to limit myself to the use with a paper cutter only.

It will be apparent that modifications in structure will readily occur to those skilled in the art for providing safety stopping mechanism similarly arranged, but in so far as changes which are made do not depart from the operative principle involved, I consider them within the scope of my invention.

Having thus described my invention, what I claim as new and desire to secure by Letters Patent, is:—

1. In combination with a rotatable element of a machine, and an element movable to bring about the operation of the machine, a weighted hook suspended so as to normally engage said first named member, interlocking means between said member and said weighted hook normally adapted to interlock at a certain position in the cycle of operation of the machine, and means of temporarily elevating the weighted hook from engagement with said first named member operatively connected to said movable element, said means of elevating said weighted hook comprising a spring tensioned roller carried by said weighted hook, and a cam track carried by said rotatable element.

2. In combination with a rotatable element of a machine, a weighted hook suspended so as to engage said elements, and means of elevating said weighted hook so as to disengage said element, said means comprising a roller carried by said weighted hook, said pulley tensioned to move in alignment with the axis of said rotatable element, and a cam track mounted on said rotatable element, said cam track so disposed on the element that the roller will normally bear on its inner edge, and said track so disposed that with an elevating movement of said weight said roller will ride along the peripheral edge of said cam track.

3. In combination with a rotatable element of a machine, said rotatable element having a notched portion, a safety lock adapted to block the operation of the rotatable element, said lock comprising a weight having a portion thereof adapted to engage said notched portion at least once during each rotation of said element, said weight so suspended as to slide along said rotatable element during the operation of the machine, and a control for bringing about the operation of the machine operatively connected with said weight.

4. In combination with a rotatable element of a machine, said rotatable element having a notched portion, a safety lock adapted to block the operation of the rotatable element, said lock comprising a weight having a portion thereof adapted to engage said notched portion at least once during each rotation of said element, said weight so suspended as to slide along said rotatable element during the operation of the machine, and a control for bringing about the operation of the machine operatively connected with said weight, the operative connection between said control and said weight being effective only during the initial starting movement of said control.

5. In combination with a machine of the character specified, a rotatable element essentially movable with the operation of the machine, said element carrying a cam track, a weight suspended so as to slidably engage said rotatable element during its cycle of operation, interengaging means on the element adapted to be blocked by the weight, and means carried by said weight adapted to engage said cam track and momentarily suspend said weight from engagement of said interengaging means on said rotatable element.

6. In combination with a machine of the character specified, a rotatable element essentially movable with the operation of the machine, said element carrying a cam track, a weight suspended so as to slidably engage said rotatable element during its cycle of operation, interengaging means on the element adapted to be blocked by the weight, and means carried by said weight adapted to engage said cam track and momentarily elevate said weight, said means comprising a roller slidably retained in said weight with a spring to force said roller into position riding on said track, when the relative position of said pulley and weight is in engaging alignment.

7. In combination with a machine of the character specified, a rotatable element essentially movable with the operation of the machine, said element carrying a cam track, a weight suspended so as to slidably engage said rotatable element during its cycle of operation, interengaging means on the element adapted to be blocked by the weight, and means carried by said weight adapted to engage said cam track and momentarily elevate said weight, means to bring about the operation of said machine, and said means operatively connected with said weight to elevate the same.

8. In combination with a machine of the character specified, a rotatable element essentially movable with the operation of the machine, said element carrying a cam track, a weight suspended so as to slidably engage said rotatable element during its cycle of operation, interengaging means on the element adapted to be blocked by the weight, and means carried by said weight adapted to engage said cam track and momentarily elevate said weight, means to bring about the operation of said machine, and said means operatively connected with said weight, said operative connection being inhibitive at ends of the cycle of movement of said operation inducing means.

9. A safety blocking device for machines, comprising in combination with a rotatable element of the machine having a notched portion, and a cam track extending substantially in alignment with the periphery of said rotatable element, and a starting control member having an element movable therewith, a pivoted weight adapted to engage said notched portion at least once during each revolution of said rotatable element, and means for elevating the weight extending into the path of the element movable with the starting control member.

10. A safety blocking device for machines, comprising in combination with a rotatable element of the machine having a notched portion, and a cam track extending substantially in alignment with the periphery of said rotatable element, and a starting control member having an element movable therewith, a pivoted weight adapted to engage said notched portion at least once during each revolution of said rotatable element, and means for elevating the weight extending into the path of the element movable with the starting control member, said elevating means comprising a roller carried by said weight adapted to engage said cam track coincident with the elevation of said weight.

CHARLES SEYBOLD.